United States Patent Office 3,503,225
Patented Mar. 31, 1970

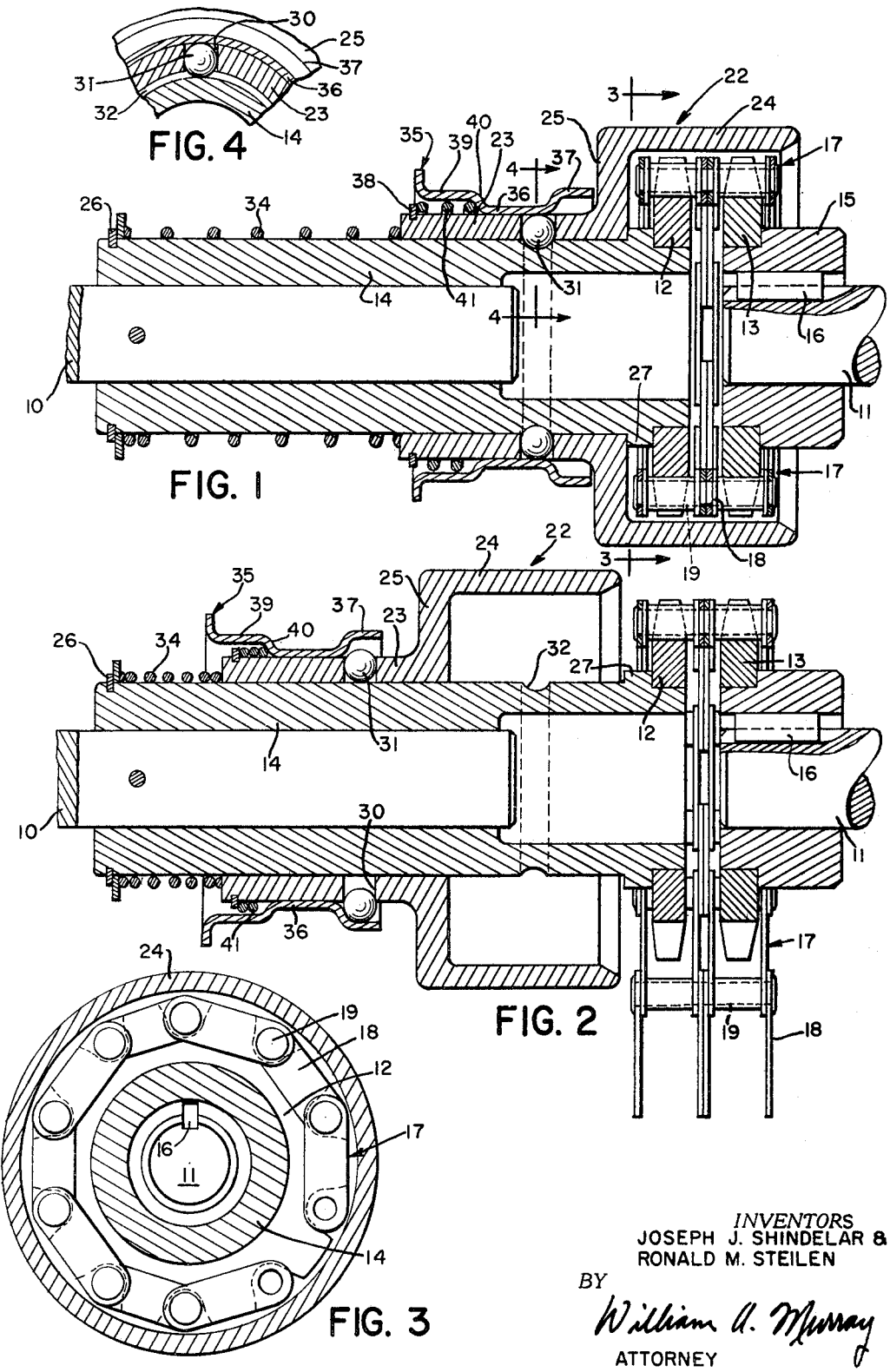

3,503,225
SHAFT COUPLER
Joseph John Shindelar, Des Moines, and Ronald Michael Steilen, Ankeny, Iowa, assignors to Deere & Company, Moline, Ill., a corporation of Delaware
Filed July 10, 1968, Ser. No. 743,671
Int. Cl. F16d 5/54
U.S. Cl. 64—19                                                                 5 Claims

ABSTRACT OF THE DISCLOSURE

A coupler device for drivingly interconnecting the ends of axially aligned shafts that is composed of a pair of sprockets fixed to rotate with the respective shafts and disposed in side-by-side relation to one another. A free length of chain is wrapped about both sprockets to cause the sprockets and shafts to rotate in unison. Supported on one of the shafts is an annular ring that may shift axially to overlie the sprockets and to retain the chain on the respective sprockets. The ring may be shifted axially so that the chain may be removed and the two shafts uncoupled.

BACKGROUND OF THE INVENTION

This invention relates to a coupling device for drivingly connecting the ends of a pair of axially aligned shafts. Still more particularly the invention relates to a coupling device that requires no tools for uncoupling but merely requires the manual shifting of a ring on the coupling device which permits the driving elements between the two shafts to be removed manually.

It has heretofore been known to provide a pair of sprockets on the ends of a pair of axially aligned shafts and to couple the two sprockets together by a chain length that is wrapped around the sprockets. Such a drive connection is shown to be old in U.S. Patent 2,540,315 which issued to N. F. Andrews, Feb. 6, 1951.

The problem that arises with the above-described type of coupling device is that the length of chain is wrapped completely around the sprockets and is held on the sprockets by means of a detachable link. Consequently when it is desired to uncouple the unit there is required the use of tools. Also, since the drive includes spockets and chains, normal good safety practice requires that the sprockets be shielded so as to alleviate the danger that might occur if they should come into contact with an operator's clothing. Therefore, if shielding is used, it must also be removed prior to the time that the detachable chain length is removed. Therefore, the actual operation of coupling and decoupling such a coupling device is somewhat time consuming and requires special tools which may or may not be available.

SUMMARY OF THE INVENTION

With the above in mind it is the primary object of the invention to provide a drive coupling between the ends of two axially aligned shafts. The coupling includes a pair of sprockets fixed to rotate with the respective shafts that lie adjacent to one another. The sprockets are drivingly connected by a length of chain that is wrapped around the sprockets and interconnects them so that they rotate in unison. The chain is held on the sprockets by a ring that fits just outwardly of the sprockets so that the chain lengths are held in the teeth of the sprockets. The ring is part of a retainer member that has an axially extending hub portion that is slidably carried for axial movement on the hub of one of the sprockets. The hub portion of the retainer and the hub portion of the sprocket are held together by a radially shiftable locking element that interconnects the two hub portions when the ring is in an overlying possition. The radially movable locking element is held in position by a latch that is slidable on the retainer hub so as to hold the lock element in its locking position. The latch is spring-loaded to its position over the locking element and may be manually moved so that the locking element may be unlocked and the entire retainer shifted axially for purposes of removing the chain lenth or for replacing the chain length on the sprockets.

BRIEF DESCRIPTION OF THE DRAWINGS

FIG. 1 is a sectional view taken through the center of the coupler device when it is in position of having coupled the two shafts.

FIG. 2 is a view similar to FIG. 1 but showing the coupler device in a position in which the length of chain is partially unwrapped from the sprockets.

FIG. 3 is a sectional view taken substantally along the line 3—3 of FIG. 1.

FIG. 4 is a sectional view taken substantially along the line 4—4 of FIG. 1.

DESCRIPTION OF THE PREFERRED EMBODIMENT

The coupler device herein to be described couples adjacent ends of a pair of axially aligned shafts 10, 11. Radial members or sprockets 12, 13 are fixed to rotate with the respective shafts 10, 11 and are disposed in side-by side relation to one another. The sprocket 12 has an elongated axial hub portion 14 that has a square internal opening for receiving the square shaft 10. The sprocket 13 has a hub portion 15 that is keyed at 16 to the round shaft 11. The sprockets 12, 13 have peripheral teeth which create outwardly opening slots. The sprockets 12, 13 are adapted to receive a single length of double-strand roller chain 17 that extends across both sprockets and unites them to rotate in unison. As is conventional, the roller chain is composed of side links 18 that are on opposite sides of the sprocket teeth and link means or pins 19 that extend through the ends of the links 18 and extend through the slots formed between the teeth of the sprockets 12, 13. The length of chain 17 is such that it completely circumscribes the two sprockets 12, 13 so that one pin 19 is positioned in each of the slots formed by the teeth.

Supported on the outer surface of the hub 14 for generally axial shiftable motion is a retainer member 22 having a hub 23 that is slidable on the hub portion 14, a collar or ring portion 24 that is outwardly of and overlies the sprockets 12, 13 and an integral radially extending flange portion 25 that rigidly connects the hub 23 to the collar 24. A snap ring 26 is provided at the end of the hub 14 and prevents the retainer member 22 from sliding off of the hub portion 14. The hub portion 14 also has a radial shoulder 27 that engages the flange 25 and limits movement of the retainer 22 axially in an opposite direction. Thus, the retainer member 22 is shiftable along the hub 14 between a first position in which the collar 24 overlies the outer periphery of the sprockets 12, 13 for purposes of retaining the chain length on the sprockets, and in a second positon as shown in FIG. 2, in which the ring or collar 24 is moved out of its overlying position for purposes of permitting the chain to be removed or for purposes of replacing the chain on the sprockets. It is clearly apparent that when the ring or collar 24 is in its overlying position in respect to the sprockets, it serves as a shield or guard for the sprockets and chain.

The hub 23 has a series of angularly spaced openings 30 that receive a series of angularly spaced ball or lock elements 31 shiftable radially in the openings 30. Reviewing FIGS. 1 and 2, it becomes apparent that the balls 31 have a greater diameter than the thickness of the hub 23. Thus, there will always be a portion of the lock elements or balls 31 projecting radially, either inwardly or outwardly, in respect to the hub 23. Positioned around the hub 14 is an annular surface recess 32 positioned so that the locking elements 31 may be seated therein when the ring portion 24 is positioned over the sprockets 12, 13. A spring structure 34 extends between the snap ring 26 and hub 23 and biases the retainer 22 toward shoulder 27.

The lock elements 31 are held in the recess 32 by means of an annular latch 35 that fits around and on the outer surface of the hub 23. The latch 35 has a radial inner portion 36 bearing against the lock elements 31 when the lock elements are seated in recess 32. The latch element also has a radial outer portion 37 that permits the lock elements 31 to extend partially radially outwardly of the hub 23, such position being clearly shown in FIG. 2. The hub 23 has a snap ring 38. The latch 35 is provided with a radially offset portion 39 that connects to the inner portion 36 by a shoulder 40. A spring 41 is provided between the snap ring 38 and shoulder 40 so as to bias the entire latch 35 in a direction toward the retainer ring 24. Thus, when the openings 30 are radially aligned with the recess 32, the pressure of the spring 41 against the latch 35 will cause the inner portion 36 to drive the locking elements or balls 31 into recess 32. The spring 41 will also prevent the latch from moving away from its overlying position. The retainer 22 will therefore be held in a position in which the ring 24 overlies the sprockets 12, 13.

Assuming that the coupler is engaged as shown in FIG. 1, and for purposes of uncoupling, it is necessary only to manually move the latch 35 axially against the pressure of the spring 41 until the radial outer portion 37 of the latch is opposite the openings 30. Further axial pressure on the latch 35 and/or the retainer 22 will cause the balls or locking elements 31 to slip out of the recess 32 and to move into the area beneath the outer latch portion 37. At this time the retainer 22 is free to move axially and reach a position as shown in FIG. 2. The chain may then be unwrapped from the sprockets 12, 13 and the sprockets will be uncoupled. For purposes of retaining the chain when uncoupled, the chain may be wrapped on the sprocket 12 and the retainer 22 moved axially until the ring covers the sprocket.

We claim:

1. A coupling drivingly connecting adjacent ends of a pair of axially aligned shafts comprising: a pair of radial members disposed in side-by-side relation and fixed to rotate with the respective shafts with at least one of said members having a hub portion and with the members having radially outwardly opening slots axially aligned with one another; link means extending between and seated in the slots to cause the radial members to rotate in unison; an axially extending retainer having a hub supported for axial movement on the aforesaid hub portion to shift axially to one position that overlies the slots to thereby retain the link means in the slots and to a second position out of overlying relation to the slots whereby the link means may be removed from and placed in the slots; a radial shiftable locking element between the hub and hub portion that is adapted to hold the hub against axial movement when the retainer is in said one position; and an axial shiftable latch carried externally on the hub to hold the locking element in its locking position.

2. A coupling drivingly connecting adjacent ends of a pair of axially aligned shafts comprising: a pair of radial members disposed in side-by-side relation and a fixed to rotate with the respective shafts with at least one of said members having a hub portion with a surface recess therein, the members having radially outwardly opening slots axially aligned with one another; link means extending between and seated in the slots to cause the radial members to rotate in unison; an axially extending retainer having a hub with a radial opening therethrough and supported for axial movement on the aforesaid hub portion to shift axially to one position that overlies the slots to thereby retain the link means in the slots and in which the opening is radially aligned with the recess, and to a second position out of overlying relation to the slots whereby the link means may be removed from and placed in the slots; a radial shiftable locking element retained in the opening and shiftable radially to seat in and out of the recess to thereby hold the hub against axial movement when the retainer is in said one position; and an axial shiftable latch carried externally on the hub to hold the locking element in its seated position in the recess.

3. The structure as set forth in claim 2 in which the element is thicker than the hub and is therefore adapted to extend at least partially radially inwardly and outwardly of the hub, and further characterized by an axially slidable latch on the outer surface of the hub that is shiftable to cover the opening to thereby retain the element in the opening and the recess.

4. The structure as set forth in claim 3 further characterized by spring means between the hub and latch for biasing the latch to its covering position in regard to the locking element.

5. A coupler drivingly connecting the ends of a pair of axially aligned shafts comprising a pair of opposed sprockets carried on the respective ends for rotation in unison with the respective shafts, and an elongated hub extending axially from one of the sprockets along the respective shaft; a free length of chain having opposite disconnected ends and carried on the sprockets for drivingly interconnecting the sprockets; a retainer member having a support portion axially shiftable along the hub and an axially extending ring portion overlying the sprocket teeth for retaining the free length of chain thereon; and a lock element between the support portion and hub for retaining the ring portion in an overlying relation to the sprockets.

References Cited

UNITED STATES PATENTS

| 953,700 | 4/1910 | Maxfield | 64—19 |
| 2,177,845 | 10/1939 | Sloan. | |
| 2,618,940 | 11/1952 | Wyzenbeek | 64—4 |
| 2,919,562 | 1/1960 | Weasler | 64—4 |

FOREIGN PATENTS 549,568  7/1932  Germany.

FRED C. MATTERN, JR., Primary Examiner

M. A. ANTONAKAS, Assistant Examiner

U.S. Cl. X.R.

64—4

UNITED STATES PATENT OFFICE
CERTIFICATE OF CORRECTION

Patent No. 3,503,225                    Dated  31 March 1970

Inventor(s)  Joseph John Shindelar and Ronald Michael Steilen

It is certified that error appears in the above-identified patent and that said Letters Patent are hereby corrected as shown below:

Insert the following claim:

6. A coupling drivingly connecting adjacent ends of a pair of axially aligned shafts comprising: a pair of sprockets disposed in side-by-side relation and fixed to rotate with the respective shafts, the sprockets having hub portions mounted on the respective ends; a length of chain having disconnected opposite free ends wrapped around both sprockets and seated in the sprocket teeth to cause the sprockets to rotate in unison; and a retainer collar slidably supported on one of the hub portions and shiftable to one position to overlie the sprockets to thereby retain the chain length on the sprockets and to a second position out of overlying relation to the sprockets whereby the chain may be removed from and placed on the sprockets.

In the heading to the printed specification, line 8, "5 Claims" should read -- 6 Claims --.

Signed and sealed this 9th day of March 1971.

(SEAL)
Attest:

EDWARD M. FLETCHER, JR.                WILLIAM E. SCHUYLER, JR.
Attesting Officer                      Commissioner of Patents